US011104872B2

(12) United States Patent
Gehrig et al.

(10) Patent No.: US 11,104,872 B2
(45) Date of Patent: *Aug. 31, 2021

(54) DEVICE, SYSTEM AND METHOD FOR EXTRACTING AND FILTERING A SUSPENSION, PREFERABLY CONTAINING PLANT CONSTITUENTS, BY MEANS OF ROTATING FILTER ELEMENTS

(71) Applicant: ZIEMANN HOLVRIEKA GMBH, Ludwigsburg (DE)

(72) Inventors: Klaus Gehrig, Ludwigsburg (DE); Klaus Karl Wasmuht, Ellingen (DE); Tobias Becher, Schwieberdingen (DE); Konstantin Ziller, Ludwigsburg (DE)

(73) Assignee: ZIEMANN HOLVRIEKA GMBH, Ludwigsburg (DE)

( * ) Notice: Subject to any disclaimer, the term of this patent is extended or adjusted under 35 U.S.C. 154(b) by 262 days.

This patent is subject to a terminal disclaimer.

(21) Appl. No.: 15/523,668

(22) PCT Filed: Nov. 2, 2015

(86) PCT No.: PCT/EP2015/075475
§ 371 (c)(1),
(2) Date: May 1, 2017

(87) PCT Pub. No.: WO2016/071287
PCT Pub. Date: May 12, 2016

(65) Prior Publication Data
US 2017/0319981 A1    Nov. 9, 2017

(30) Foreign Application Priority Data

Nov. 3, 2014   (DE) .......................... 102014116008.8
Nov. 7, 2014   (DE) .......................... 102014116304.4
Apr. 16, 2015  (DE) .......................... 102015105849.9

(51) Int. Cl.
*C12C 7/16*   (2006.01)
*C12C 7/06*   (2006.01)
(Continued)

(52) U.S. Cl.
CPC .......... *C12C 7/163* (2013.01); *B01D 11/0238* (2013.01); *B01D 11/0242* (2013.01);
(Continued)

(58) Field of Classification Search
CPC .. C12C 7/163; C12C 7/14; C12C 7/17; B01D 11/0238; B01D 33/41; B01D 33/42
See application file for complete search history.

(56) References Cited

U.S. PATENT DOCUMENTS 1,922,730 A   8/1933   Gore et al.
3,249,443 A   5/1966   Reiter

FOREIGN PATENT DOCUMENTS

CN    1484544 A    3/2004
DE     826742 C    1/1952
(Continued)

OTHER PUBLICATIONS

Office Action for Chinese Patent Application No. 201580059549.0, dated Oct. 22, 2018.
(Continued)

*Primary Examiner* — Ryan B Huang
(74) *Attorney, Agent, or Firm* — Merchant & Gould P.C.

(57) ABSTRACT

A device, system and method are for treating a suspension, containing plant constituents, in particular separating a liquid or a solid therefrom, in the field of production of food, pharmaceutical and luxury products, and to corresponding uses. The device for continuously or discontinuously treating a suspension, in particular for separating a liquid or liquid phase or a solid or a residual phase from the suspension includes: a receiving unit for receiving the suspension
(Continued)

and at least one separating device having a surface having openings. The surface can be brought into contact with the suspension, if the suspension is present in the receiving unit for separation into the liquid phase and the solid phase. During the operation of the device, the surface is arranged such that it is moved or can be moved or can be rotated relative to the suspension, the solid phase and/or the receiving unit.

14 Claims, 3 Drawing Sheets

(51) Int. Cl.
    *C12C 7/00*     (2006.01)
    *B01D 11/02*     (2006.01)
    *C12C 7/14*     (2006.01)
    *B01D 33/21*     (2006.01)
    *B01D 33/23*     (2006.01)
    *C12C 1/00*     (2006.01)
    *B01D 33/15*     (2006.01)
    *B01D 33/41*     (2006.01)
    *C12C 7/165*     (2006.01)

(52) U.S. Cl.
    CPC ...... *B01D 11/0246* (2013.01); *B01D 11/0249* (2013.01); *B01D 11/0269* (2013.01); *B01D 33/15* (2013.01); *B01D 33/21* (2013.01); *B01D 33/23* (2013.01); *B01D 33/41* (2013.01); *C12C 1/00* (2013.01); *C12C 7/00* (2013.01); *C12C 7/06* (2013.01); *C12C 7/14* (2013.01); *C12C 7/165* (2013.01)

(56) References Cited

FOREIGN PATENT DOCUMENTS

| DE | 2161654 A1 | 6/1973 | | |
|---|---|---|---|---|
| EP | 0713367 A1 | 5/1996 | | |
| GB | 417302 A | * | 10/1934 | ......... B01D 11/0276 |
| GB | 417302 A | | 10/1934 | |
| WO | WO-9505091 A1 | * | 2/1995 | ......... B01D 11/0219 |
| WO | 02/053259 A2 | | 7/2002 | |

OTHER PUBLICATIONS

Office Action for German Patent Application No. 102015105849.9, dated Feb. 8, 2018.
International Search Report for PCT/EP2015/075475, dated Feb. 4, 2016.
Search Report for German Patent Application No. 10 2014 116 304.4, dated Aug. 14, 2015.
Office Action for Indian Patent Application No. 201727019164, dated Sep. 23, 2019.

* cited by examiner

DEVICE, SYSTEM AND METHOD FOR EXTRACTING AND FILTERING A SUSPENSION, PREFERABLY CONTAINING PLANT CONSTITUENTS, BY MEANS OF ROTATING FILTER ELEMENTS

This application is a National Stage Application of PCT/EP2015/075475, filed Nov. 2, 2015, which claims benefit of German Patent Application No. 10 2014 116 008.8, filed Nov. 3, 2014, German Patent Application No. 10 2014 116 304.4, filed Nov. 7, 2014, German Patent Application No. 10 2015 105 849.9, filed Apr. 16, 2015, and which applications are incorporated herein by reference. To the extent appropriate, a claim of priority is made to each of the above disclosed applications.

The invention relates to a device, system and method for treating a suspension, preferably containing plant constituents, in particular separating a liquid or a solid therefrom, in the field of production of food, pharmaceutical and luxury products, and to corresponding uses.

BACKGROUND OF THE INVENTION

When treating suspensions, preferably containing plant constituents, in particular separating a liquid (liquid phase; with or without solid residues) or a solid (residual phase; with or without residual liquid) therefrom, in the field of production of food, pharmaceutical and luxury products, after the separating device has been filled with the suspension a filter layer is often formed from material originating from the suspension, in particular from plant constituents, on the filter.

A disadvantage of the conventional approach is that the plant constituents preferably contained in the suspension led to premature blocking or displacement of the treatment device and in particular the separating device, which in turn resulted in the required treatment or separating time being prolonged. For a long time there has been a desire to considerably reduce the method step of separating the suspension or even to perform it as a continuous method step. In practice, it has hitherto been impossible to reduce separating times of suspensions containing plant constituents in spite of decades of further development and optimisation of the existing separating systems.

SUMMARY OF THE INVENTION

In terms of the invention, the term "suspension" includes the meaning which is familiar to the skilled person in the field of production of food, pharmaceutical and luxury products. However, "suspension" can also include diluted suspensions, in particular mixtures of a suspension and water, and concentrated suspensions, i.e., residual phases, for instance suspensions, from which a liquid phase has already been separated. Moreover, "suspension" can include all of the types of suspensions which are known to the person skilled in the art in the field of production of food, pharmaceutical and luxury products and which contain plant constituents. In one particular embodiment, the suspension in accordance with the invention can also be limited to a suspension, of which the proportion of solids consists of a plant constituent or a mixture of plant constituents. In one particular embodiment, the suspension in accordance with the invention can further be limited to a suspension, of which the proportion of liquid consists of water. In one particular embodiment, the suspension in accordance with the invention can be limited to a suspension, of which the proportion of solids contains a plant constituent or a mixture of plant constituents. In one particular embodiment, the suspension in accordance with the invention can also be limited to a suspension, of which the proportion of solids consists of a plant constituent or a mixture of plant constituents and of which the proportion of liquid consists of water.

In accordance with the invention, the term "plant constituent" is understood to mean constituents of a plant, in particular fruits, seeds, leaves, flowers, branches, bark, wood or roots, which can be acquired directly or are obtained by processing. In particular, the plant can be: a cereal, such as barley, wheat, oats, spelt; a vegetable; or a herb or herbs. Preferably, the plant is selected from a group consisting of: tea, mint, cannabis, manioc, hops, tobacco, cocoa, ginkgo, aloe vera, breadseed poppy, valerian, sage, hibiscus, balm and chamomile.

In accordance with the invention, the term "liquid phase" is understood to mean a liquid which has been obtained from the suspension by separating solids or parts of the suspension. The "liquid phase" can be a liquid or can also contains solids, in particular vegetable solids, in addition to a liquid. When using a filter-like or screen-like device for separating the suspension, the permeate typically forms the "liquid phase".

In accordance with the invention, the term "residual phase" is understood to mean a solid, a mixture of solids or a suspension which has been obtained from the above-defined "suspension" by separating the "liquid phase". The "residual phase" can also contain liquid in addition to solids, in particular vegetable solids. The mass-related solids proportion of the "residual phase" is higher than that of the "liquid phase" produced from the same separating step. When using a filter-like or screen-like device for separating the suspension, the retentate typically forms the "residual phase".

In accordance with the invention, the term "separating device" is understood to mean any device which is suitable for separating one or more components of a mixture of substances. In particular, "separating device" includes a filter, screen or the like.

When separating a suspension by means of the separating device in accordance with the invention, two fractions or phases are produced, of which the one having the higher liquid proportion or the one which consists of liquid is defined as the "liquid phase", and the one having the lower liquid proportion and higher solids proportion is defined as the "residual phase" within the scope of this application.

In accordance with the invention, "mixing" is understood to mean adding together two or more substances. However, this can also include the homogenisation of the resulting mixture.

In accordance with the invention, "extraction agent" is understood to mean any extraction agent which is known and typical in the field of production of food, pharmaceutical and luxury products. In particular, with the scope of this invention the term "extraction agent" includes the following substances and groups including the associated sub-groups and modifications: water, preferably demineralised water, drinking water, and service water; alcohols, preferably methanol, ethanol, propanol, isopropanol, butanol, isobutanol, pentanol, isopentanol; esters; acids, preferably formic acid, citric acid and acetic acid; and hydrocarbons/oils, alkanes, alkenes, alkynes, benzene, aromatic compounds having aliphatic and aromatic substituents, carboxylic acid esters, tetramethylsilane, carbon disulphide, pressurised carbon dioxide; ether, diethyl ether and tetrahydrofuran;

ketones, acetone; lactones, 4-butyrolactone; nitriles, acetonitrile; nitro compounds, nitromethane; tertiary carboxylic acid amides, dimethylformamide; urea derivatives, tetramethyl urea and dimethylpropylene urea; sulfoxides, dimethyl sulfoxide; sulfones, sulfolane; carbonic acid ester, dimethyl carbonate, ethylene carbonate; cooking oils and cooking fats.

In terms of the present application, a method or method step is defined as being "continuous" if this method or method step is performed or runs without interruption. However, in accordance with the invention the definition of "continuously" can additionally also include methods or method steps which have one or more interruptions on a time scale of overall at the most 20%, preferably at the most 15%, preferably at the most 10%, preferably at the most 5%, in particular at the most 2% of the total duration of the relevant method or method step; or have one or more interruptions at an extent of the mass or volumetric flow rate of overall at the most 20%, preferably at the most 15%, preferably at the most 10%, preferably at the most 5%, in particular at the most 2% of the total mass or volumetric flow rate of the relevant method or method step.

Within the scope of this application, all methods or method steps not covered by the above definition of "continuous" are defined as being "discontinuous" or "batchwise". The definition of "discontinuous" can also include methods or method steps, of which the performance, although effected without interruption, is completed after at the most eight hours, preferably at the most six hours, and in which a predetermined portion of a substrate is treated or processed.

In terms of the present application, the term "surface" (FA, FA1, FA2, ...) of a separating device (T, T1, T2, ...) includes the part of the entire outer, i.e. in contact with the environment, top or peripheral surface of the separating device which has the openings OP for separating a suspension or residual phase and thus a separating or filtering function.

Within the scope of this application, the statements "about", "approximately" or the like are understood to mean a relative deviation from the respective reference value of at the most 10%, preferably at the most 5%, preferably at the most 3%, in particular at the most 1%.

OBJECT OF THE INVENTION

It is an object of the invention to provide a device, system and method for treating a suspension, preferably a suspension containing plant constituents, in particular separating a liquid/liquid phase and/or a solid/residual phase therefrom, in the field of production of food, pharmaceutical and luxury products, and corresponding uses which are suitable for improving or simplifying, in particular shortening the treatment of the suspension, preferably containing plant constituents, in particular separating a liquid or a solid therefrom.

It is an aspect of the present invention to prevent or at least reduce the blocking or clogging of the surface of the separating device which is used for treating the suspension, in particular separating a liquid/liquid phase or a solid/residual phase therefrom.

DESCRIPTION OF THE INVENTION

The object described above is achieved by the subjects of the claims and/or the subjects described hereinafter (numbers 1 to 103).

1. Device (V) for continuously or discontinuously treating a suspension (MA), preferably containing plant constituents, in particular for separating a liquid or liquid phase (WO), or a solid or residual phase (RM) from the suspension (MA), in the field of production of food, pharmaceutical and luxury products, at least comprising:
   a receiving unit (AG) for receiving the suspension (MA);
   at least one separating device (T) having a surface (FA);
   wherein the surface (FA) has a plurality or multiplicity of openings (OP);
   wherein the device (V) is preferably suitable for separating the suspension (MA) into the liquid phase (WO) and the residual phase (RM) by means of the surface (FA) of the separating device (T);
   wherein the surface (FA) or a part thereof can be brought into contact with the suspension (MA), if the suspension (MA) is present in the receiving unit (AG) for separation into the liquid phase (WO) and the solid phase (RM);
   wherein, during the operation of the device (V), the surface (FA) is arranged such that it is moved or can be moved or can be rotated relative to the suspension (MA), the solid phase (RM) and/or the receiving unit (AG).

2. Device according to number 1, characterised in that the separating device (T) is arranged in the device (V) such that by performing the relative movement or rotational movement the contact between the surface (FA) or a partial surface thereof and the suspension (MA) present in the receiving unit (AG) can be intermittently interrupted and restored after the interruption has occurred; wherein the interruption and restoration of the contact between the surface (FA) or a part thereof and the suspension (MA) can preferably be repeated.

3. Device according to number 1 or 2, characterised in that the separating device (T) is arranged in the device (V) such that by performing the relative movement or rotational movement the surface (FA) or a partial surface thereof exits from the suspension (MA) in the region of the level or at the level of the suspension (MA) or in the region of the surface or at the surface of the suspension (MA), issues out of the suspension (MA) at this location or the contact with the suspension (MA) is interrupted at this location, wherein the movement direction of the surface (FA), as viewed in the region of the level or liquid level or level of the suspension (MA) or at the level of the suspension (MA), forms, together with the level of the suspension (MA) or the surface of the suspension (MA) or the horizontal, an angle of 30 to 90°, preferably 45 to 90°, preferably 60 to 90°, preferably 70 to 90°, preferably 80 to 90°, preferably 85 to 90°, preferably 87 to 90°, in particular 90°.

4. Device according to any one of numbers 1 to 3, characterised in that the device (V), in particular the separating device (T), can be controlled by means of a control device (C) such that a relative movement or rotational movement of the surface (FA) is effected during the entire period of treatment of the suspension (MA), in particular separating a liquid or a solid from the suspension (MA).

5. Device according to any one of numbers 1 to 4, characterised in that the separating device (T) is arranged with respect to the receiving unit (AG) such that during the operation of the device (V) for treating the suspension (MA), preferably containing plant constituents, in particular for separating a liquid or a solid from the suspension (MA), the surface (FA) is covered by the suspension (MA) or is immersed in the suspension (MA) at a proportion in the range of 1 to 95%, preferably 5 to 95%, preferably 5 to 75%, preferably 5 to 50%, preferably 10 to 90%, preferably 15 to 80%, preferably 20 to 80%, preferably 20 to 70%, preferably 20 to 60%, preferably 20 to 50%, preferably 20 to 40%, preferably 30 to 40%, preferably 5 to 80%, preferably 5 to 40%, preferably 5 to 30%, preferably 5 to 25%, preferably 5 to 15%, in particular 20 to 30%, if the suspension (MA) is present in the receiving unit (AG); and the surface (FA) is arranged in the periphery of the residual portion preferably in a gas-filled space above the suspension (MA) or protrudes therein.

6. Device according to any one of numbers 1 to 5, characterised in that the openings (OP) have a size or pore size or aperture in the range of 5 to 10000 µm, preferably 10 to 1000 µm, preferably 10 to 500 µm, preferably 20 to 400 µm, preferably 25 to 500 µm, preferably 30 to 300 µm, preferably 40 to 250 µm, preferably 45 to 350 µm, preferably 45 to 200 µm, preferably 45 to 100 µm, preferably 55 to 300 µm, in particular 65 to 250 µm.

7. Device according to any one of numbers 1 to 6, characterised in that the separating device (T) is designed as a separating device having a rotatably mounted shaft or having a rotatably mounted surface (FA) or as a rotatably mounted separating device or rotatably mounted filter; and/or
    the separating device (T) is disk-shaped or cylindrical or is substantially disk-shaped or cylindrical; and/or
    wherein the base surface and/or the peripheral surface of the separating device (T) is formed partially or completely as a separating or filtering surface, in particular as the surface (FA); and/or
    wherein the separating device (T) is arranged in the device (V) such that the central axis or an axis of rotation of the separating device (T) or the surface (FA) is arranged substantially in parallel with the liquid level of a liquid introduced into the receiving unit (AG) of the device (V), or the central axis or an axis of rotation of the separating device (T) or the surface (FA) forms, together with the liquid level of a liquid introduced into the receiving unit (AG) of the device (V) or with the horizontal, an angle with a value in the range of 0 to <90°, preferably 0 to 45°, preferably 0 to 30°, preferably 0 to 20°, preferably 0 to 15°, preferably 0 to 10°, in particular 0 to 5°.

8. Device according to any one of numbers 1 to 7, characterised in that the relative movement or rotational movement of the surface (FA) is effected in an uninterrupted or intermittent manner, in particular at regular time intervals.

9. Device according to any one of numbers 1 to 8, characterised in that the device (V) forms at least one flow path; and/or
    a liquid, in particular the suspension (MA), can flow through the at least one flow path in a manner driven by gravity.

10. Device according to any one of numbers 1 to 9, characterised in that the surface (FA) is formed as a flat or planar surface or as a surface which has a convexly or concavely curved or wavelike or zigzag-shaped contour with respect to the suspension (MA); and/or
    the separating device (T), preferably the surface (FA), has at least one protrusion (VO); wherein the at least one protrusion (VO) is arranged such that it can be brought into contact with the suspension (MA); wherein the at least one protrusion (VO) is suitable for moving or entraining solid particles, which originate from the suspension (MA), in the suspension (MA), and preferably for discharging said solid particles from the suspension (MA) and/or from the receiving unit (AG); wherein the at least one protrusion (VO) preferably has a shape in the form of a bar, paddle, star, channel or pocket.

11. Device according to any one of numbers 1 to 10, characterised in that the device (V) has one or several, preferably two, separating devices (T; T1, T2); wherein the separating devices (T1, T2) are each designed as a separating device having a rotatably mounted shaft or as a rotatably mounted separating device or rotatably mounted filter; and/or
    wherein the two separating devices (T1, T2) are each arranged in the device (V) such that the central axis or an axis of rotation of each of the two separating devices (T1, T2) or their surfaces (FA1, FA2) is arranged substantially in parallel with the liquid level of a liquid introduced into the receiving unit (AG) of the device (V), or the central axis or an axis of rotation of each of the two separating devices (T1, T2) or their surfaces (FA1, FA2) forms, together with the liquid level of a liquid introduced into the receiving unit (AG) of the device (V) or with the horizontal, an angle with a value in the range of 0 to <90°, preferably 0 to 45°, preferably 0 to 30°, preferably 0 to 20°, preferably 0 to 15°, preferably 0 to 10°, in particular 0 to 5°; and/or
    wherein the two separating devices (T1, T2) are arranged with respect to one another in the device (V) such that the central axes or an axis of rotation of each of the two separating devices (T1, T2) or their surfaces (FA1, FA2) form an angle with a value in the range of 0 to <90°, preferably 0 to 45°, preferably 0 to 30°, preferably 0 to 20°, preferably 0 to 15°, preferably 0 to 10°, in particular 0 to 5°; and/or
    wherein the two separating devices (T1, T2) have an identical central axis or axis of rotation or their central axes or axes of rotation are arranged collinearly in the device (V); and/or
    wherein the two separating devices (T1, T2) have a common rotary shaft; and/or
    wherein the two separating devices (T1, T2) are arranged in the device (V) such that the largest spaced interval, which is measured preferably in parallel with the rotary shaft or as a normal spaced interval, between the two surfaces (FA1, FA2) of the two separating devices (T1, T2) is in the range of >2 cm to 100 cm, preferably 3 to 50 cm, preferably 4 to 30 cm, preferably 5 to 25 cm, preferably 10 to 30 cm, in particular 10 to 20 cm; and/or
    the smallest spaced interval, which is measured preferably in parallel with the rotary shaft or as a normal spaced interval, between the two surfaces (FA1, FA2) of the two separating devices (T1, T2) is in the range of >2 cm to 100 cm, preferably 3 to 50 cm, preferably 4 to 30 cm, preferably 5 to 25 cm, preferably 10 to 30 cm, in particular 10 to 20 cm.

12. Device according to any one of numbers 1 to 11, characterised in that the at least one separating device (T; T1, T2) is arranged in the device (V) such that the largest spaced interval, which is measured preferably as a normal spaced interval, between the surface (FA) and a wall of the device (V), preferably the receiving unit (AG), is in the range of >2 cm to 100 cm, preferably 3 to 50 cm, preferably 4 to 30 cm, preferably 5 to 25 cm, preferably 10 to 30 cm, in particular 10 to 20 cm; and/or
    the smallest spaced interval, which is measured preferably as a normal spaced interval, between the surface (FA) and a wall of the device (V), preferably the receiving unit (AG), is in the range of >2 cm to 100 cm, preferably 3 to 50 cm, preferably 4 to 30 cm, preferably 5 to 25 cm, preferably 10 to 30 cm, in particular 10 to 20 cm.

13. Device (V) for continuously or discontinuously treating a suspension (MA), preferably containing plant constituents, in particular for separating a liquid or a solid from the suspension (MA), in the field of production of food, pharmaceutical and luxury products, preferably a device according to any one of numbers 1 to 12 or comprising a feature defined in any one of numbers 1 to 12, at least comprising:
  a tub-like receiving unit (AG) for receiving the suspension (MA);
  at least one separating device (T), preferably two separating devices (T1, T2), each having a surface (FA; FA1, FA2);
  wherein the at least one separating device (T; T1, T2) is formed in each case as a rotatably mounted, disk-shaped or cylindrical filter;
  wherein the surface (FA; FA1, FA2) is in each case the base surface of the at least one separating device (T; T1, T2) or a part thereof;
  wherein the surface (FA; FA1, FA2) is formed in each case as a flat or substantially flat filtering surface having a multiplicity of openings (OP);
  wherein the device (V) is preferably suitable for separating the suspension (MA) into a liquid phase (WO) and a residual phase (RM) by means of the surface (FA; FA1, FA2);
  wherein the respective axis of rotation of the at least one separating device (T; T1, T2) is arranged perpendicularly or substantially perpendicularly with respect to the respective surface (FA; FA1, FA2);
  wherein the respective axis of rotation of the at least one separating device (T; T1, T2) forms, together with the liquid level of a liquid introduced into the receiving unit (AG) or with the horizontal, an angle with a value in the range of 0 to 20°, preferably 0 to 15°, preferably 0 to 10°, in particular 0 to 5°;
  wherein, when two separating devices (T1, T2) are present, they are arranged in the device (V) such that the normal spaced interval between the two surfaces (FA1, FA2) of the two separating devices (T1, T2) is in the range of 3 to 50 cm, preferably 4 to 30 cm, preferably 5 to 25 cm, preferably 10 to 30 cm, in particular 10 to 20 cm; and
  wherein the at least one separating device (T; T1, T2) is arranged with respect to the receiving unit (AG) such that during the operation of the device (V) for separating the suspension (MA) the surface (FA) is covered by the suspension (MA) or is immersed in the suspension (MA) at a proportion in the range of 1 to 95%, preferably 5 to 95%, preferably 15 to 80%, preferably 20 to 80%, preferably 20 to 70%, preferably 20 to 60%, preferably 20 to 50%, preferably 20 to 40%, preferably 30 to 40%, preferably 5 to 80%, preferably 5 to 40%, preferably 5 to 30%, preferably 5 to 25%, preferably 5 to 20%, preferably 5 to 15%, in particular 20 to 30%, if the suspension (MA) is present in the receiving unit (AG); and
  the surface (FA) is arranged in the periphery of the residual portion in a gas-filled space above the suspension (MA) or protrudes therein;
  wherein the surface (FA) or a part thereof can be brought into contact with the suspension (MA), if the suspension (MA) is present in the receiving unit (AG) for separation into the liquid phase (WO) and the residual phase (RM);
  wherein, during the operation of the device (V), the surface (FA) is arranged such that it is moved or can be moved or can be rotated relative to the suspension (MA), the residual phase (RM) and/or the receiving unit (AG).

14. Device (V) for continuously or discontinuously treating a medium (M), preferably for separating solids from the medium (M), in the field of production of food, pharmaceutical and luxury products, wherein the medium (M) is a suspension or a precursor thereof;
  wherein the device (V) comprises at least:
  a receiving unit (AG) for receiving the medium (M);
  at least one separating device (T) having a surface (FA);
  wherein the surface (FA) has a multiplicity of openings (OP);
  wherein the device (V) is preferably suitable for separating the medium (M) into two fractions by means of the surface (FA) of the separating device (T);
  wherein the surface (FA) or a part thereof can be brought into contact with the medium (M), if the medium (M) is present in the receiving unit (AG);
  wherein, during the operation of the device (V), the surface (FA) is arranged such that it is moved or can be moved or can be rotated relative to the medium (M), one of the resulting fractions and/or the receiving unit (AG).

15. Device (V) according to number 14, characterised in that the device (V) further comprises at least one of the features of numbers 2 to 13.

16. Device according to any one of numbers 1 to 15, characterised in that the device (V) has a unit (WZ) for supplying an extraction agent, preferably water.

20. System for continuously or discontinuously treating a suspension (MA), preferably containing plant constituents, in particular for separating a liquid or a solid from the suspension (MA), in the field of production of food, pharmaceutical and luxury products, at least comprising:
  a first device (V1), wherein the first device (V1) is preferably a device (V) according to any one of numbers 1 to 16;
  wherein the first device (V1) has a first receiving unit (AG1) for receiving the suspension (MA);
  wherein the first device (V1) has at least a first separating device (T1) having a first surface (FA1);
  wherein the first surface (FA1) has a multiplicity of openings (OP);
  wherein the first device (V1) is preferably suitable for separating a suspension (MA) into a first liquid phase (WO1) and a first residual phase (RM1) by means of the first surface (FA1) of the first separating device (T1);
  wherein the first surface (FA1) can be brought into contact with the suspension (MA), if the suspension (MA) is present in the first receiving unit (AG1) for separation into the first liquid phase (WO1) and the first residual phase (RM1);
  wherein, during the operation of the first device (V1), the first surface (FA1) is arranged such that it is moved or can be moved or can be rotated relative to the suspension (MA), the first residual phase (RM1) and/or the first receiving unit (AG1);
  wherein the first device (V1), in particular the first separating device (T1), can preferably be controlled by means of a first control device (C1) such that a relative movement or rotational movement of the first surface (FA1) is effected during the entire period of separation of the suspension (MA).

21. System according to number 20, characterised in that the first separating device (T1) is arranged with respect to the first receiving unit (AG1) such that during the operation of the first device (V1) for separating the suspension (MA) the first surface (FA1) is covered by the suspension (MA) or is immersed in the suspension (MA) at a proportion in the range of 1 to 95%, preferably 5 to 95%, preferably 5 to 75%, preferably 5 to 50%, preferably 5 to 80%, preferably 5 to 40%, preferably 5 to 30%, preferably 5 to 25%, preferably 5 to 20%, in particular 5 to 15%, if the suspension (MA) is present in the first receiving unit (AG1); and the first surface (FA1) is arranged in the periphery of the residual portion preferably in a first gas-filled space above the suspension (MA) or protrudes therein.

22. System according to number 20 or 21, characterised in that it further comprises:

a second device (V2), wherein the second device (V2) is preferably a device (V) according to any one of numbers 1 to 16;

wherein the second device (V2) has a second receiving unit (AG2), preferably a receiving vessel, for receiving the first residual phase (RM1) or a mixture containing the first residual phase (RM1);

wherein the second device (V2) has at least a second separating device (T2) having a second surface (FA2);

wherein the second surface (FA2) has a multiplicity of openings (OP);

wherein the second device (V2) is preferably suitable for separating a first residual phase (RM1) into a second liquid phase (WO2) and a second residual phase (RM2) by means of the second surface (FA2) of the second separating device (T2);

wherein the second surface (FA2) can be brought into contact with the first residual phase (RM1), if the first residual phase (RM1) is present in the second receiving unit (AG2) for separation into the second liquid phase (WO2) and the second residual phase (RM2);

wherein, during the operation of the second device (V2), the second surface (FA2) is arranged such that it is moved or can be moved or can be rotated relative to the first residual phase (RM1), the second residual phase (RM2) and/or the second receiving unit (AG2); and wherein the second device (V2), in particular the second separating device (T2), can preferably be controlled by means of a second control device (C2) such that the relative movement of the second surface (FA2) is effected in an uninterrupted or intermittent manner, in particular at regular time intervals, during the entire period of separation of the first residual phase (RM1).

23. System according to number 22, characterised in that the second separating device (T2) is arranged with respect to the second receiving unit (AG2) such that during the operation of the second device (V2) for separating the first residual phase (RM1) the second surface (FA2) is covered by the first residual phase (RM1) or is immersed in the first residual phase (RM1) at a proportion in the range of 1 to 95%, preferably 5 to 95%, preferably 5 to 80%, preferably 5 to 75%, preferably 5 to 50%, preferably 5 to 40%, preferably 5 to 30%, preferably 5 to 25%, preferably 5 to 20%, in particular 5 to 15%, if the first residual phase (RM1) is present in the second receiving unit (AG2); and the residual portion of the second surface (FA2) is arranged preferably in a second gas-filled space or protrudes therein, wherein the second gas-filled space (GR2) is arranged over or above the first residual phase (RM1).

24. System according to number 22 or 23, characterised in that it further comprises:

a third device (V3), wherein the third device (V3) is preferably a device (V) according to any one of numbers 1 to 16;

wherein the third device (V3) has a third receiving unit (AG3), preferably a receiving vessel, for receiving the second residual phase (RM2) or a mixture containing the second residual phase (RM2);

wherein the third device (V3) has at least a third separating device (T3) having a third surface (FA3);

wherein the third surface (FA3) has a multiplicity of openings (OP);

wherein the third device (V3) is preferably suitable for separating the second residual phase (RM2) into a third liquid phase (WO3) and a third residual phase (RM3) by means of the third surface (FA3) of the third separating device (T3);

wherein the third surface (FA3) can be brought into contact with the second residual phase (RM2), if the second residual phase (RM2) is present in the third receiving unit (AG3) for separation into the third liquid phase (WO3) and the third residual phase (RM3);

wherein, during the operation of the third device (V3), the third surface (FA3) is arranged such that it is moved or can be moved or can be rotated relative to the second residual phase (RM2), the third residual phase (RM3) and/or the third receiving unit (AG3); and wherein the third device (V3), in particular the third separating device (T3), can preferably be controlled by means of a third control device (C3) such that the relative movement of the third surface (FA3) is effected in an uninterrupted or intermittent manner, in particular at regular time intervals, during the entire period of separation of the second residual phase (RM2).

25. System according to number 24, characterised in that the third separating device (T3) is arranged with respect to the third receiving unit (AG3) such that during the operation of the third device (V3) for separating the second residual phase (RM2) the third surface (FA3) is covered by the second residual phase (RM2) or is immersed in the second residual phase (RM2) at a proportion in the range of 1 to 95%, preferably 5 to 95%, preferably 5 to 80%, preferably 5 to 75%, preferably 5 to 50%, preferably 5 to 30%, preferably 5 to 25%, preferably 5 to 20%, in particular 5 to 15%, if the second residual phase (RM2) is present in the third receiving unit (AG3); and the residual portion of the third surface (FA3) is arranged preferably in a third gas-filled space or protrudes therein, wherein the third gas-filled space (GR3) is arranged over or above the second residual phase (RM2).

26. System according to number 24 or 25, characterised in that it further comprises:

a fourth device, wherein the fourth device is preferably a device (V) according to any one of numbers 1 to 16;

wherein the fourth device has a fourth receiving unit, preferably a receiving vessel, for receiving the third residual phase (RM3) or a mixture containing the third residual phase (RM3);

wherein the fourth device has at least a fourth separating device having a fourth surface;

wherein the fourth surface has a multiplicity of openings (OP);

wherein the fourth device is preferably suitable for separating the third residual phase (RM3) into a fourth liquid phase (WO4) and a fourth residual phase by means of the fourth surface of the fourth separating device;

wherein the fourth surface can be brought into contact with the third residual phase (RM3), if the third residual phase (RM3) is present in the fourth receiving unit for separation into the fourth liquid phase (WO4) and the fourth residual phase;

wherein, during the operation of the fourth device, the fourth surface is arranged such that it is moved or can be moved or can be rotated relative to the third residual phase (RM3), the fourth residual phase and/or the fourth receiving unit; and wherein the fourth device, in particular the fourth separating device, can preferably be controlled by means of a fourth control device such that the relative movement of the fourth surface is effected in an uninterrupted or intermittent manner, in particular at regular time intervals, during the entire period of separation of the third residual phase (RM3).

27. System according to number 26, characterised in that the fourth separating device is arranged with respect to the fourth receiving unit such that during the operation of the fourth device for separating the third residual phase (RM3) the fourth surface is covered by the third residual phase (RM3) or is immersed in the third residual phase (RM3) at a proportion in the range of 1 to 95%, preferably 5 to 95%, preferably 5 to 80%, preferably 5 to 75%, preferably 5 to 50%, preferably 5 to 40%, preferably 5 to 30%, preferably 5 to 25%, preferably 5 to 20%, in particular 5 to 15%, if the third residual phase (RM3) is present in the fourth receiving unit; and the residual portion of the fourth surface is arranged preferably in a fourth gas-filled space or protrudes therein, wherein the fourth gas-filled space is arranged over or above the third residual phase (RM3).

28. System according to any one of numbers 20 to 27, characterised in that at least one separating device (T), selected from the group consisting of the first separating device (T1), the second separating device (T2), the third separating device (T3) and the fourth separating device, is designed as a separating device having a rotatably mounted separating or filtering surface, in particular having a rotatably mounted surface (FA1, FA2, FA3), or as a rotatably mounted separating device or rotatably mounted filter; and/or at least one separating device (T), selected from the group consisting of the first separating device (T1), the second separating device (T2), the third separating device (T3) and the fourth separating device, is disk-shaped or cylindrical or is substantially disk-shaped or cylindrical; and/or wherein the base surface and/or the peripheral surface of the separating device or a part of the separating device is formed partially or completely as a separating or filtering surface, in particular as the surface (FA1, FA2, FA3); and/or wherein the at least one separating device (T), selected from the group consisting of the first separating device (T1), the second separating device (T2), the third separating device (T3) and the fourth separating device, is arranged in the system such that the central axis or an axis of rotation of the separating device is arranged substantially in parallel with the liquid level of a liquid introduced into the respective receiving unit (AG1, AG2, AG3) of the respective device (V1, V2, V3), or the central axis or an axis of rotation of the separating device (T) or its respective surface (FA1, FA2, FA3) forms, together with the liquid level of a liquid introduced into the respective receiving unit (AG1, AG2, AG3) of the respective device (V1, V2, V3) or with the horizontal, an angle with a value in the range of 0 to <90°, preferably 0 to 45°, preferably 0 to 30°, preferably 0 to 20°, preferably 0 to 15°, preferably 0 to 10°, in particular 0 to 5°.

29. System according to any one of numbers 20 to 28, characterised in that the openings (OP) have a size or pore size or aperture in the range of 5 to 10000 µm, preferably 10 to 1000 µm, preferably 10 to 500 µm, preferably 20 to 400 µm, preferably 25 to 500 µm, preferably 30 to 300 µm, preferably 40 to 250 µm, preferably 45 to 350 µm, preferably 45 to 200 µm, preferably 55 to 300 µm, preferably 45 to 100 µm, in particular 65 to 250 µm.

30. System according to any one of numbers 20 to 29, characterised in that the relative movement or rotational movement of the first surface (FA1), the second surface (FA2), the third surface (FA3) and/or the fourth surface is effected in an uninterrupted or intermittent manner, in particular at regular time intervals.

31. System according to any one of numbers 20 to 30, characterised in that, during the operation of the first device (V1) for separating the suspension (MA), preferably containing plant constituents, the first surface (FA1) is covered by the suspension (MA) or is immersed in the suspension (MA) at a proportion in the range of 1 to 95%, preferably 5 to 95%, preferably 5 to 75%, preferably 5 to 50%, preferably 10 to 90%, preferably 15 to 80%, preferably 20 to 80%, preferably 20 to 70%, preferably 20 to 60%, preferably 20 to 50%, preferably 20 to 40%, preferably 30 to 40%, preferably 20 to 30%, preferably 5 to 80%, preferably 5 to 40%, preferably 5 to 30%, preferably 5 to 25%, preferably 5 to 20%, in particular 5 to 15%.

32. System according to any one of numbers 20 to 31, characterised in that during the operation of the second device (V2) for separating the first residual phase (RM1) the second surface (FA2) is covered by the first residual phase (RM1) or is immersed in the first residual phase (RM1) at a proportion in the range of 1 to 95%, preferably 5 to 95%, preferably 5 to 75%, preferably 5 to 50%, preferably 20 to 90%, preferably 30 to 80%, preferably 35 to 70%, preferably 40 to 60%, preferably 5 to 80%, preferably 5 to 40%, preferably 5 to 30%, preferably 5 to 25%, preferably 5 to 20%, in particular 5 to 15%.

33. System according to any one of numbers 20 to 32, characterised in that during the operation of the third device (V3) for separating the second residual phase (RM2) the third surface (FA3) is covered by the second residual phase (RM2) or is immersed in the second residual phase (RM2) at a proportion in the range of 1 to 95%, preferably 5 to 95%, preferably 5 to 75%, preferably 5 to 50%, preferably 20 to 90%, preferably 30 to 80%, preferably 35 to 70%, preferably 40 to 60%, preferably 5 to 80%, preferably 5 to 40%, preferably 5 to 30%, preferably 5 to 25%, preferably 5 to 20%, in particular 5 to 15%.

34. System according to any one of numbers 20 to 33, characterised in that during the operation of the fourth device for separating the third residual phase (RM3) the fourth surface is covered by the third residual phase (RM3) or is immersed in the third residual phase (RM3) at a proportion in the range of 1 to 95%, preferably 5 to 95%, preferably 5 to 75%, preferably 5 to 50%, preferably 20 to 90%, preferably 30 to 80%, preferably 35 to 70%, preferably 40 to 60%, preferably 5 to 80%, preferably 5 to 40%, preferably 5 to 30%, preferably 5 to 25%, preferably 5 to 20%, in particular 5 to 15%.

35. System according to any one of numbers 20 to 34, characterised in that two, three, four or more, preferably up to 10, devices, selected from the group consisting of the first device (V1), the second device (V2), the third device (V3) and the fourth device, are connected in series or in parallel.

36. System according to any one of numbers 20 to 35, characterised in that two, three, four or more first devices (V1) are connected in parallel; and/or
two, three, four or more second devices (V2) are connected in parallel; and/or
two, three, four or more third devices (V3) are connected in parallel; and/or
two, three, four or more fourth devices are connected in parallel; and/or
the first devices (V1), the second devices (V2), the third devices (V3) and/or the fourth devices are connected in series.

37. System according to any one of numbers 20 to 36, characterised in that the system forms at least one flow path; and
a liquid or in particular the suspension (MA), the first residual phase (RM1), the second residual phase (RM2), the third residual phase (RM3) and/or the fourth residual phase can flow through the at least one flow path preferably in a manner driven by gravity.

38. System for continuously or discontinuously treating a medium (M), preferably for separating solids from the medium (M), in the field of production of food, pharmaceutical and luxury products, wherein the medium (M) is a suspension or a precursor thereof;
the system at least comprising:
at least a first device (V1), wherein the first device (V1) is preferably a device (V) according to any one of numbers 1 to 16;
wherein the first device (V1) has a first receiving unit (AG1) for receiving the medium (M);
wherein the first device (V1) has at least a first separating device (T1) having a first surface (FA1);
wherein the first surface (FA1) has a multiplicity of openings (OP);
wherein the first device (V1) is preferably suitable for separating the medium (M) into two fractions by means of the first surface (FA1) of the first separating device (T1);
wherein the first surface (FA1) can be brought into contact with the medium (M), if the medium (M) is present in the first receiving unit (AG1);
wherein, during the operation of the first device (V1), the first surface (FA1) is arranged such that it is moved or can be moved or can be rotated relative to the medium (M), one of the resulting fractions and/or the receiving unit (AG); and
wherein the first device (V1), in particular the first separating device (T1), can preferably be controlled by means of a first control device (C1) such that a relative movement or rotational movement of the first surface (FA1) is effected during the entire period of separation of the medium (M).

39. System according to number 38, characterised in that the system further comprises at least one of the features of numbers 20 to 37.

40. System according to any one of numbers 20 to 39, characterised in that the first device (V1), in particular the first receiving unit (AG1), has a first unit (WZ1) for supplying an extraction agent, preferably water; and/or
the second device (V2), in particular the second receiving unit (AG2), has a second unit (WZ2) for supplying an extraction agent, preferably water; and/or
the third device (V3), in particular the third receiving unit (AG3), has a third unit (WZ3) for supplying an extraction agent, preferably water; and/or
the fourth device, in particular the fourth receiving unit (AG4), has a fourth unit (WZ4) for supplying an extraction agent, preferably water.

41. System according to any one of numbers 20 to 40, characterised in that the system has a first unit (WZ1), a second unit (WZ2) and/or a third unit (WZ3) each for supplying an extraction agent, preferably water; and
wherein the first unit (WZ1) is preferably arranged in the system such that the extraction agent is supplied in the first device (V1) and/or downstream with respect to the first device (V1) and upstream with respect to the second device (V2) and/or in the second device (V2); and/or
wherein the second unit (WZ2) is preferably arranged in the system such that the extraction agent is supplied in the second device (V2) and/or downstream with respect to the second device (V2) and upstream with respect to the third device (V3) and/or in the third device (V3); and/or
wherein the third unit (WZ3) is preferably arranged in the system such that the extraction agent is supplied in the third device (V3) and/or downstream with respect to the third device (V3) and upstream with respect to a fourth device (V4) and/or in the fourth device (V4).

42. System according to any one of numbers 20 to 39, characterised in that a first unit (WZ1) for supplying an extraction agent, preferably water, is arranged between the first device (V1), in particular the first receiving unit (AG1), and the second device (V2), in particular the second receiving unit (AG2); and/or
a second unit (WZ2) for supplying an extraction agent, preferably water, is arranged between the second device (V2), in particular the second receiving unit (AG2), and the third device (V3), in particular the third receiving unit (AG3); and/or
a third unit (WZ3) for supplying an extraction agent, preferably water, is arranged between the third device (V3), in particular the third receiving unit (AG3), and the fourth device, in particular the fourth receiving unit.

43. System according to any one of numbers 40 to 42, characterised in that the first unit (WZ1), the second unit (WZ2) and/or the third unit (WZ3) are each formed as an outlet opening, preferably as a nozzle, in particular as a flat jet nozzle, spray head or spray cone.

44. System according to any one of numbers 20 to 43, characterised in that the system has at least one barrier element;
wherein preferably a first barrier element is arranged downstream with respect to the first device (V1) and upstream with respect to the second device (V2); and/or
wherein preferably a second barrier element is arranged downstream with respect to the second device (V2) and upstream with respect to the third device (V3); and/or
wherein preferably a third barrier element is arranged downstream with respect to the third device (V3) and upstream with respect to the fourth device.

56. Method for continuously or discontinuously treating a medium (M), preferably for separating solids from the medium (M), in the field of production of food, pharmaceutical and luxury products, wherein the medium (M) is a suspension or a precursor thereof;
the method comprising the steps of:
(a) providing the medium (M);
(b) separating the medium (M) into a liquid phase (WO) and a residual phase (RM);
characterised in that
step (b) is performed using the device (V) according to any one of numbers 1 to 16 or the system according to any one of numbers 20 to 44.

58. Method for continuously or discontinuously treating a suspension (MA), preferably a suspension (MA) containing plant constituents, in particular for separating a liquid or a solid from the suspension (MA), in the field of production of food, pharmaceutical and luxury products, comprising the steps of:
(a) supplying the suspension (MA) to a first receiving unit (AG1) of a first device (V1), wherein the first device (V1) is preferably a device according to any one of numbers 1 to 16;
(b) separating the suspension (MA) into a first liquid phase (WO1) and a first residual phase (RM1) in the first device (V1) by means of a first separating device (T1);
wherein the suspension (MA) is brought into contact with a first surface (FA1) of the first separating device (T1),
wherein the filtrate or permeate is the first liquid phase (WO1) and the filter residue or retentate is the first residual phase (RM1);
wherein, during the separation of the suspension (MA) into the first liquid phase (WO1) and the first residual phase (RM1), the first surface (FA1) moves relative to the suspension (MA), the first residual phase (RM1) and/or the first receiving unit (AG1), or
during the separation of the suspension (MA) into the first liquid phase (WO1) and the first residual phase (RM1), the first surface (FA1) rotates about a first central axis or axis (AX1) of the first separating device (T1); and
wherein the relative movement or the rotational movement of the first surface (FA1) is effected in an uninterrupted or intermittent manner, preferably at regular time intervals, during the entire period of separation of the suspension (MA).

59. Method for continuously or discontinuously treating a suspension (MA), preferably a suspension (MA) containing plant constituents, in particular for separating a liquid or a solid from the suspension (MA), in the field of production of food, pharmaceutical and luxury products, comprising the steps of:
(a) supplying the suspension (MA) to a first receiving unit (AG1) of a first device (V1), wherein the first device (V1) is preferably a device according to any one of numbers 1 to 16;
(b) separating the suspension (MA) into a first liquid phase (WO1) and a first residual phase (RM1) in the first device (V1), by means of separating or filtering the suspension (MA) with the aid of a first surface (FA1) of a first separating device (T1);
wherein the filtrate or permeate is the first liquid phase (WO1) and the filter residue or retentate is the first residual phase (RM1);
wherein the separation is driven by the hydrostatic pressure of the suspension (MA) and/or another pressure acting upon the suspension (MA) and/or a negative pressure acting upon the first residual phase (RM1);
wherein, during the separation of the suspension (MA) into the first liquid phase (WO1) and the first residual phase (RM1), the first surface (FA1) moves relative to the suspension (MA) present in the device (V1), the first residual phase (RM1) present in the first device (V1) and/or the first receiving unit (AG1), or during the separation of the suspension (MA), the first surface (FA1) rotates about a first axis (AX1) of the first separating device (T1); and
wherein the relative movement or the rotational movement of the first surface (FA1) is effected in an uninterrupted or intermittent manner, preferably at regular time intervals, during the entire period of separation of the suspension (MA).

60. Method according to any one of numbers 56, 58 or 59, further comprising the steps of:
(c) mixing a predefined volume of an extraction agent, preferably water or a liquid phase, preferably the third liquid phase (WO3), with the first residual phase (RM1), obtained in the separation according to step (b), wherein a first mixture (MX1) is obtained;
(d) prior to step (c): supplying the first residual phase (RM1) to the second receiving unit (AG2) of the second device (V2); or
after step (c): supplying the first mixture (MX1) to the second receiving unit (AG2) of the second device (V2);
wherein the second device (V2) is preferably a device according to any one of numbers 1 to 16;
(e) separating the thus obtained first mixture (MX1) into a second liquid phase (WO2) and a second residual phase (RM2) by means of a second separating device (T2) or by means of separating or filtering the first mixture (MX1) with the aid of a second surface (FA2) of the second separating device (T2) in the second device (V2);
wherein the filtrate or permeate is the second liquid phase (WO2) and the filter residue or retentate is the second residual phase (RM2);
wherein the separation is driven by the hydrostatic pressure of the first mixture (MX1) and/or another pressure acting upon the first mixture (MX1) and/or a negative pressure acting upon the second residual phase (RM2);
wherein, during the separation of the first mixture (MX1) into the second liquid phase (WO2) and the second residual phase (RM2), the second surface (FA2) moves relative to the first mixture (MX1) present in the second device (V2), the second residual phase (RM2) present in the second device (V2) and/or the second receiving unit (AG2), or during the separation of the first mixture (MX1) into the second liquid phase (WO2) and the second residual phase (RM2), the second surface (FA2) rotates about a second axis (AX2) of the second separating device (T2); and
wherein the relative movement or the rotational movement of the second surface (FA2) is effected in an uninterrupted or intermittent manner, preferably at regular time intervals, during the entire period of separation of the first mixture (MX1).

61. Method according to number 60, further comprising the steps of:
(f) mixing a predefined volume of an extraction agent, preferably water or a liquid phase, preferably the fourth liquid phase (WO4), with the second residual phase (RM2), obtained in the separation according to step (e), wherein a second mixture (MX2) is obtained;

(g) prior to step (f): supplying the second residual phase (RM2) to the third receiving unit (AG3) of the third device (V3); or
after step (f): supplying the second mixture (MX2) to the third receiving unit (AG3) of the third device (V3);
wherein the third device (V3) is preferably a device according to any one of numbers 1 to 16;
(h) separating the thus obtained second mixture (MX2) into a third liquid phase (WO3) and a third residual phase (RM3) by means of a third separating device (T3) or by means of separating or filtering the second mixture (MX2) with the aid of a third surface (FA3) of the third separating device (T3) in the third device (V3);
wherein the filtrate or permeate is the third liquid phase (WO3) and the filter residue or retentate is the third residual phase (RM3);
wherein the separation is driven by the hydrostatic pressure of the second mixture (MX2) and/or another pressure acting upon the second mixture (MX2) and/or a negative pressure acting upon the third residual phase (RM3);
wherein, during the separation of the second mixture (MX2) into the third liquid phase (WO3) and the third residual phase (RM3), the third surface (FA3) moves relative to the second mixture (MX2) present in the third device (V3), the third residual phase (RM3) present in the third device (V3) and/or the third receiving unit (AG3), or
during the separation of the second mixture (MX2) into the third liquid phase (WO3) and the third residual phase (RM3), the third surface (FA3) rotates about a third axis (AX3) of the third separating device (T3); and
wherein the relative movement or the rotational movement of the third surface (FA3) is effected in an uninterrupted or intermittent manner, preferably at regular time intervals, during the entire period of separation of the second mixture (MX2).

62. Method according to number 61, further comprising the steps of:
(i) mixing a predefined volume of an extraction agent, preferably water or a liquid phase, with the third residual phase (RM3), obtained in the separation according to step (h), wherein a third mixture (MX3) is obtained;
(j) prior to step (i): supplying the third residual phase (RM3) to a fourth receiving unit of the fourth device; or
after step (i): supplying the third mixture (MX3) to the fourth receiving unit (AG4) of the fourth device (V4);
wherein the fourth device (V4) is preferably a device (V) according to any one of numbers 1 to 16;
(k) separating the thus obtained third mixture (MX3) into a fourth liquid phase (WO4) and a fourth residual phase by means of a fourth separating device or by means of separating or filtering the third mixture (MX3) with the aid of a fourth surface of the fourth separating device in the fourth device;
wherein the filtrate or permeate is the fourth liquid phase (WO4) and the filter residue or retentate is the fourth residual phase;
wherein the separation is driven by the hydrostatic pressure of the third mixture (MX3) and/or another pressure acting upon the third mixture (MX3) and/or a negative pressure acting upon the fourth residual phase;
wherein, during the separation of the third mixture (MX3) into the fourth liquid phase (WO4) and the fourth residual phase, the fourth surface moves relative to the third mixture (MX3) present in the fourth device, the fourth residual phase (RM4) present in the fourth device and/or the fourth receiving unit, or
during the separation of the third mixture (MX3) into the fourth liquid phase (WO4) and the fourth residual phase, the fourth surface rotates about a fourth axis of the fourth separating device; and
wherein the relative movement or the rotational movement of the fourth surface is effected in an uninterrupted or intermittent manner, preferably at regular time intervals, during the entire period of separation of the third mixture (MX3).

63. Method according to any one of numbers 56 or 58 to 62, characterised in that the relative movement is a rotational movement clockwise or anticlockwise, preferably anticlockwise, wherein the rotational direction is determined from the viewing direction in which the inflowing medium to be separated, preferably the suspension (MA) or residual phase (RM1, RM2, RM3) to be separated or the mixture (MX1, MX2, MX3) flows into the device from the left and the residual phase to be discharged leaves the device (V1, V2, V3) to the right; and/or
the relative movement of the first surface (FA1), the second surface (FA2), the third surface (FA3) and/or the fourth surface is effected at a velocity in the range of 0.01 to 2.5 m/s, in particular 0.01 to 1.8 m/s; and/or
the rotational movement of the first surface (FA1), the second surface (FA2), the third surface (FA3) and/or the fourth surface is effected at a rotational speed in the range of 1 to 60 rpm, preferably 1 to 40 rpm, preferably 1 to 30 rpm, preferably 1 to 20 rpm, in particular 1 to 12 rpm; and/or
the rotational movement of the first surface (FA1), the second surface (FA2), the third surface (FA3) and/or the fourth surface is effected at a peripheral velocity or tip velocity in the range of 0.01 to <2.0 m/s, preferably 0.05 to 1.8 m/s, preferably 0.1 to 1.5 m/s, in particular 0.2 to 1.5 m/s.

64. Method according to any one of numbers 56 or 58 to 63, characterised in that the supply of the suspension (MA) in step (a), the supply of the first residual phase (RM1) or the first mixture (MX1) in step (d), the supply of the second residual phase (RM2) or the second mixture (MX2) in step (g) and/or the supply of the third residual phase (RM3) or the third mixture (MX3) in step (j) is/are performed in the range of 0.25 to <2.0 m/s, preferably 0.3 to 1.8 m/s, preferably 0.5 to 1.5 m/s, in particular 0.8 to 1.5 m/s.

65. Method according to any one of numbers 56 or 58 to 64, characterised in that it further comprises the step of:
(l) using the first liquid phase (WO1), the second liquid phase (WO2), the third liquid phase (WO3) or the fourth liquid phase (WO4) to produce a food, pharmaceutical or luxury product.

66. Method according to any one of numbers 56 or 58 to 65, characterised in that it further comprises the steps of:
(m) producing a mixture from at least two arbitrary liquid phases, in particular from two, three or four arbitrary liquid phases, selected from the group consisting of the first liquid phase (WO1), the second liquid phase (WO2), the third liquid phase (WO3) and the fourth liquid phase (WO4); and
(n) using the mixture (WOMX) resulting in step (j) to produce a food, pharmaceutical or luxury product.

67. Method according to any one of numbers 56 or 58 to 66, characterised in that, during the separation of the suspension (MA), the contact between the first surface (FA1) or a partial surface thereof and the suspension (MA) present in the first receiving unit (AG1) is intermittently interrupted and restored after the interruption has occurred by performing the relative movement or rotational movement of the first surface (FA1);
  wherein the interruption and restoration of the contact between the first surface (FA1) or a partial surface thereof and the suspension (MA) is preferably repeated.
70. Method according to any one of numbers 56 or 58 to 67, characterised in that, during the separation of the first residual phase (RM1), the contact between the second surface (FA2) or a partial surface thereof and the first residual phase (RM1) present in the second receiving unit (AG2) is intermittently interrupted and restored after the interruption has occurred by performing the relative movement or rotational movement of the second surface (FA2);
  wherein the interruption and restoration of the contact between the second surface (FA2) or a partial surface thereof and the first residual phase (RM1) is preferably repeated.
71. Method according to any one of numbers 56 or 58 to 67 or 70, characterised in that, during the separation of the second residual phase (RM2), the contact between the third surface (FA3) or a partial surface thereof and the second residual phase (RM2) present in the third receiving unit (AG3) is intermittently interrupted and restored after the interruption has occurred by performing the relative movement or rotational movement of the third surface (FA3);
  wherein the interruption and restoration of the contact between the third surface (FA3) or a partial surface thereof and the second residual phase (RM2) is preferably repeated.
72. Method according to any one of numbers 56 or 58 to 67 or 70 or 71, characterised in that, during the separation of the third residual phase (RM3), the contact between the fourth surface or a partial surface thereof and the third residual phase (RM3) present in the fourth receiving unit is intermittently interrupted and restored after the interruption has occurred by performing the relative movement or rotational movement of the fourth surface;
  wherein the interruption and restoration of the contact between the fourth surface or a partial surface thereof and the third residual phase (RM3) is preferably repeated.
73. Method according to any one of numbers 56 or 58 to 67 or 70 to 72, characterised in that, during the separation of the suspension (MA) according to step (b), the first surface (FA1) is covered by the suspension (MA) or is immersed in the suspension (MA) at a proportion in the range of 1 to 95%, preferably 5 to 95%, preferably 5 to 75%, preferably 5 to 50%, preferably 10 to 90%, preferably 15 to 80%, preferably 20 to 80%, preferably 20 to 70%, preferably 20 to 60%, preferably 20 to 50%, preferably 20 to 40%, preferably 30 to 40%, preferably 5 to 80%, preferably 5 to 40%, preferably 5 to 30%, preferably 5 to 25%, preferably 5 to 20%, preferably 5 to 15%, in particular 20 to 30%, and
  the first surface (FA1) is arranged in the periphery of the residual portion preferably in a first gas-filled space over or above the suspension (MA) or protrudes therein.
74. Method according to any one of numbers 56 or 58 to 67 or 70 to 73, characterised in that, during the separation of the first mixture (MX1) according to step (e), the second surface (FA2) is covered by the first mixture (MX1) or is immersed in the first mixture (MX1) at a proportion in the range of 1 to 95%, preferably 5 to 95%, preferably 5 to 75%, preferably 5 to 50%, preferably 10 to 90%, preferably 15 to 80%, preferably 20 to 80%, preferably 20 to 90%, preferably 30 to 80%, preferably 35 to 70%, preferably 5 to 80%, preferably 5 to 40%, preferably 5 to 30%, preferably 5 to 25%, preferably 5 to 20%, preferably 5 to 15%, in particular 40 to 60%.
75. Method according to any one of numbers 56 or 58 to 67 or 70 to 74, characterised in that, during the separation of the second mixture (MX2) according to step (h), the third surface (FA3) is covered by the second mixture (MX2) or is immersed in the second mixture (MX2) at a proportion in the range of 1 to 95%, preferably 5 to 95%, preferably 5 to 75%, preferably 5 to 50%, preferably 10 to 90%, preferably 20 to 90%, preferably 30 to 80%, preferably 35 to 70%, preferably 5 to 80%, preferably 5 to 40%, preferably 5 to 30%, preferably 5 to 25%, preferably 5 to 20%, preferably 5 to 15%, in particular 40 to 60%.
76. Method according to any one of numbers 56 or 58 to 67 or 70 to 75, characterised in that, during the separation of the third mixture (MX3) according to step (k), the fourth surface is covered by the third mixture (MX3) or is immersed in the third mixture (MX3) at a proportion in the range of 1 to 95%, preferably 5 to 95%, preferably 5 to 75%, preferably 5 to 50%, preferably 10 to 90%, preferably 20 to 90%, preferably 30 to 80%, preferably 35 to 70%, preferably 5 to 80%, preferably 5 to 40%, preferably 5 to 30%, preferably 5 to 25%, preferably 5 to 20%, preferably 5 to 15%, in particular 40 to 60%.
77. Method according to any one of numbers 56 or 58 to 67 or 70 to 76, characterised in that at least one medium, selected from the group consisting of the suspension (MA), the first liquid phase (WO1), the second liquid phase (WO2), the third liquid phase (WO3), the fourth liquid phase (WO4), the first residual phase (RM1), the second residual phase (RM2), the third residual phase (RM3), the fourth residual phase, the first mixture (MX1), the second mixture (MX2) and the third mixture (MX3), is moved during at least one of the steps (a, b, d, e, g, h, j and k) in a manner driven by gravity, in particular only driven by gravity.
78. Method for continuously or discontinuously treating a medium (M), preferably for separating solids from the medium (M), in the field of production of food, pharmaceutical and luxury products, wherein the medium (M) is a suspension or a precursor thereof; the method comprising the steps of:
(a) supplying the medium (M) to a first receiving unit (AG1) of a first device (V1), wherein the first device (V1) is preferably a device according to any one of numbers 1 to 16;
(b) separating the medium (M) into two fractions in the first device (V1), by means of separating or filtering the medium (M) with the aid of a first surface (FA1) of a first separating device (T1);
  wherein the separation is driven by the hydrostatic pressure of the medium (M) and/or another pressure acting upon the medium (M) and/or a negative pressure acting upon one of the fractions;
  wherein, during the separation of the medium (M), the first surface (FA1) moves relative to the medium (M) present in the device (V1), one of the resulting fractions and/or the first receiving unit (AG1), or
  during the separation of the medium (M), the first surface (FA1) rotates about a first axis (AX1) of the first separating device (T1); and wherein the relative movement or the rotational movement of the first surface (FA1) is effected in an uninterrupted or intermittent manner, preferably at regular time intervals, during the entire period of separation of the medium (M).

79. Method according to number 78, characterised in that the method further comprises at least one of the features of numbers 56 or 58 to 67 or 70 to 77.

100. Use of a device according to any one of numbers 1 to 16 or a system according to any one of numbers 20 to 44 for continuously or discontinuously obtaining a liquid phase (WO) and/or a residual phase (RM) from a suspension (MA), preferably from a suspension (MA) containing plant constituents, preferably for separating the suspension (MA), preferably containing plant constituents, in the liquid phase (WO) and/or the residual phase (RM), in particular for separating a liquid or a solid from the suspension (MA) in the field of production of food, pharmaceutical and luxury products.

101. Use of a device according to any one of numbers 1 to 16 or a system according to any one of numbers 20 to 44 for continuously or discontinuously treating a medium (M), preferably for separating a liquid and/or a solid from the medium (M), in the field of production of food, pharmaceutical and luxury products;
wherein the medium (M) is a suspension or a precursor thereof.

102. Use of a separating device (T), preferably a filter, in particular a separating device (T; T1, T2) according to any one of numbers 1 to 16 for continuously or discontinuously obtaining a liquid phase (WO) from a suspension (MA) in the field of production of food, pharmaceutical and luxury products;
wherein the separating device (T) has a surface (FA) with a multiplicity of openings having a size or pore size or aperture in the range of 5 to 10000 μm, preferably 10 to 1000 μm, preferably 25 to 500 μm, preferably 45 to 350 μm, preferably 55 to 300 μm, in particular 65 to 250 μm;
wherein, as the liquid phase (WO) is being obtained, the surface (FA) is moved relative to the suspension (MA);
wherein as the liquid phase is being obtained the surface (FA) is covered by the suspension (MA) or is immersed in the suspension (MA) at a proportion in the range of 1 to 95%, preferably 5 to 95%, preferably 5 to 75%, preferably 5 to 50%, preferably 10 to 90%, preferably 15 to 80%, preferably 20 to 80%, preferably 20 to 70%, preferably 20 to 60%, preferably 20 to 50%, preferably 20 to 40%, preferably 30 to 40%, preferably 5 to 80%, preferably 5 to 40%, preferably 5 to 30%, preferably 5 to 25%, preferably 5 to 20%, preferably 5 to 15%, in particular 20 to 30%.

103. Use according to number 102, characterised in that the separating device is designed as a separating device having a rotatably mounted separating surface or filtering surface or as a rotatably mounted separating device or rotatably mounted filter; and/or
the separating device is disk-shaped or cylindrical or is substantially disk-shaped or cylindrical; and/or
wherein the base surface and/or the peripheral surface of the separating device or a part of the base surface and/or the peripheral surface is formed partially or completely as a separating or filtering surface; and/or
wherein the separating device is arranged in the system such that the central axis or an axis of rotation of the separating device is arranged substantially in parallel with a liquid level (LL) of the suspension (MA) present in the area surrounding the separating device, or
the central axis or an axis of rotation of the separating device forms, together with the liquid level (LL) of the suspension (MA) present in the area surrounding the separating device or with the horizontal, an angle with a value in the range of 0.1 to 45°, preferably 0.1 to 20°, preferably 0.5 to 10°, preferably 0.5 to 8°, preferably 0.5 to 6°, in particular 0.5 to 4°.

The inventors of the present application have recognised that the method step of treating, in particular separating, a suspension, the solids proportion of which preferably containing plant constituents or consisting of plant constituents, can be considerably shortened if, during the treatment or separation, the formation of a solids layer, preferably consisting of plant constituents of the suspension, such as in particular plant leaves or the constituents thereof, is substantially or completely avoided. According to the inventors' knowledge, this is achieved by virtue of the fact that, during the separation of the suspension, a surface provided with openings is moved relative to the suspension provided.

By virtue of the relative movement between the suspension and the surface of a separating device, the formation of a solids layer preferably consisting of plant constituents of the suspension is at least substantially avoided. As a result, the flow channels in the surface of the separating device provided with openings are kept clear so that the liquid proportion of the suspension, when flowing through the surface of the separating device, is subjected to less flow resistance in comparison with the conventional treating or separating methods.

In accordance with the invention, in contrast to the classic separating devices, a movement of the separating device relative to the suspension ensures, against expectation, that no appreciable solids layer preferably consisting of plant constituents is formed as the liquid particles pass through with solids being retained on the surface of the separating device. By virtue of the fact that the suspension, as a result of the relative movement, encounters permanently or at least intermittently a surface which to a certain extent is "fresh" and is suitable for separation, the flow resistance as the liquid or liquid phase flows through the separating device remains high without any substantial change during the course of the separation.

The inventors assume that on the one hand the formation of a solids layer is prevented by the relative movement between the suspension and the surface of the separating device provided with openings. On the other hand, it is assumed that the components of the suspension, in particular the vegetable solid particles preferably contained therein, in conjunction with the described relative movement have an abrasive effect upon the surface of the separating device so that during the separation in accordance with the invention the suspension has an unexpectedly high cleaning effect upon the surface of the separating device. The separating performance is hereby significantly increased and the necessary separating time is hereby significantly shortened.

Since, in accordance with the invention, the surface of the separating device is blocked or clogged, if at all, only to a minimal extent even when volumetric flow rates of the suspension are high, the procedure of obtaining the liquid phase in accordance with the invention can be performed continuously or discontinuously with high volumetric flow rates and a long period of standing time. In contrast to the separating methods performed previously as batch methods, the invention provides, when configured as a continuous method or a continuously operated device, shorter separating times, smaller devices and other advantages associated with continuous methods.

During the movement performed relative to the suspension, the contact between the surface of the separating device or a partial surface thereof and the suspension can be temporarily interrupted. If, during the separation from the suspension, the relative movement is e.g. a rotational movement of the separating device or its surface, the surface or at least a partial surface thereof can exit from the suspension and then re-enter the suspension at a later point in time. On the one hand, as this surface element of the separating device exits from the suspension, gravity acts upon the solids possibly adhering to the surface element. At the moment when a particle exits from the suspension, i.e., at the moment the particle becomes detached from the liquid surface, the uplift which still acts against the gravity in the liquid body of the suspension ceases to be effective so that in total a force which is directed to the earth's centre prevails. On the other hand, as said particle exits from the liquid, the surface tension of the suspension is effective so that the adhering particles tend to remain on the surface of the suspension or even in the suspension accumulated at the separating device as a surface element of the separating device exits from the suspension.

Therefore, forces specifically at the liquid level of the suspension in the region of the boundary surface with respect to the surface or filtering surface of the separating device act upon the solid particles of the suspension, wherein these forces can oppose the relative movement of the surface on the whole. Therefore, solid particles which are discharged, entrained or intermittently adhere to the surface of the separating device tend to exert, at the surface, in opposition to the relative movement a frictional effect at the moving surface or filtering surface of the separating device.

It is assumed that as a result the above-described cleaning effect is further enhanced and improved cleaning of the surface of the separating device is achieved.

In accordance with the invention, the surface of the separating device and/or the separating device as such can consist e.g. of high-grade steel, copper, synthetic material, preferably polypropylene, or a woven material/textile.

By virtue of the fact that the relative movement of the surface is performed during the entire period or at least for most of the period of separation, the surface of the separating device is cleaned constantly and therefore to a maximum extent in terms of time.

The surface of the separating device which is moved relatively can be covered by the suspension or can be immersed in the suspension only to a limited extent during the separation procedure.

If the surface of the separating device is covered only partially by the suspension, solid particles which accumulate in the region of the level or surface of the suspension by reason of the relative movement of the separating device, can be surprisingly easily and effectively "entrained" by the moving surface of the separating device and thus discharged from the suspension and finally from the device. It is also surprising that the discharged particles, i.e., the residual phase or a part thereof, are discharged relatively "dry" having a dry substance content of up to 75%. Such dry discharge of the residual phase has not been achieved by the hitherto used separating techniques.

The advantage of a high degree of coverage of the surface of the separating device by the suspension is a large filtering surface and thus a high flow rate of suspension or residual phase and a high volumetric flow rate of obtained liquid phase.

The advantage of a medium to low degree of coverage of the surface of the separating device by the suspension is that the space provided for the enrichment and discharge, preferably the "driest" possible discharge, of solids from the suspension and finally from the device is sufficiently available in the region of the surface of the separating device above the level of the suspension.

With regard to the above-described characteristics, a degree of coverage or immersion of the surface of the separating device in the range of 1 to 60%, preferably 5 to 30%, preferably 5 to 20%, preferably 5 to 15%, preferably 5 to 10% has proven to be particularly advantageous.

In accordance with the invention, the gas-filled space of the device can contain a gas which contains or consists of air or preferably an inert gas, such as carbon dioxide, nitrogen or helium or mixtures thereof. The use of inert gases can prevent disadvantageous oxidation of the suspension or the liquid phase and residual phase obtained therefrom.

By selecting the optimum pore size, it is possible, depending upon the composition of the suspension, to set the volumetric flow rate of the obtained liquid phase and the properties thereof in an advantageous manner in relation to the material composition thereof. For instance, in the case of a pore size of at least 65 μm, a satisfactory volumetric flow rate of the obtained liquid phase is achieved. If a pore diameter of greater than 350 μm is selected, then even though a high volumetric flow rate of liquid phase is achieved, coarser particles are possibly no longer adequately separated.

Furthermore, the separating device can be designed as a rotatably mounted separating device or as a rotatably mounted filter. In particular, the axis of rotation of the separating device can form, together the liquid level of a liquid introduced into the receiving unit of the device, a small angle value as described above. By virtue of this arrangement in which the surface of the separating device provided with openings is arranged perpendicularly or approximately perpendicularly with respect to the level of the suspension, a high relative velocity of the suspension with respect to the surface of the separating device is achieved when the separating device is rotated. As a result, effective cleaning of the surface is achieved.

In the case of the embodiment of the separating device in the form of a disk in which the base surface is formed as a surface which has the openings, or as separating surface, a compact separating device having a high ratio of surface having a separating effect to the entire surface can be achieved.

By selecting the spatial arrangement of the central axis or the axis of rotation of the separating device or its surface preferably approximately in parallel with the level or surface of the suspension, wherein deviations from the parallel orientation are certainly possible within specific limits in order to achieve the effects in accordance with the invention, the relative movement of the surface, the partial coverage of the surface or the partial immersion into the suspension, effective cleaning of the surface and high discharge of solids can be achieved with a structurally simple device which is easy to handle.

Furthermore, a more or less perpendicular arrangement of the surface with respect to the level of the suspension in combination with the merely partial coverage of the surface by the suspension and the rotational movement also enables a relatively "dry" residual phase, i.e. a concentrated suspension, to be separated in the region where the surface of the separating device exits from the surface of the suspension during the course of the rotational movement. Surprisingly, this allows even a relatively "thick" residual phase or even relatively dry solid particles to be discharged from the suspension and finally from the separating device.

It is particularly advantageous if the surface of the separating device is moved or can be moved relative to the suspension, the residual phase and/or the receiving unit of the device such that a plurality of surface elements, the surface of the separating device which are covered by the suspension during separation, exit from the suspension during the course of the relative movement and at least intermittently are not covered by the suspension, in order to then be immersed into the suspension as the relative movement progresses.

If the suspension or a residual phase can flow through the device in accordance with the invention solely as a result of gravity, the design of the device in accordance with the invention is simplified considerably e.g. by the omission of pumps etc.

Moreover, in accordance with the invention the energy consumption for operating the device is reduced by 40% or more compared with a conventional separating device. Furthermore, the lower consumption and/or the smaller number of consumers reduces the current consumption peaks of the devices or systems in accordance with the invention. As a result, the required installed power can be reduced. Furthermore, the amount of energy applied to the suspension to be separated and therefore the heating thereof are lower, which has a beneficial effect upon the product. By being able to omit the action of pumping, the approaching flow pressure of the inflowing suspension or residual phase is lower, whereby the surface of the separating device is additionally protected against becoming blocked.

The surface of the separating device can have a diverse shape which provides a high level of flexibility in terms of plant design. Preferred contours of the surface, such as e.g. convex, concave, undulating or zigzag-shaped contours can cause additional flow effects or swirling on the surface of the separating device in the vicinity of the surface which moves in the suspension or residual phase and moves relative to the suspension or residual phase. This further improves the cleaning of the surface.

The provision of protrusions, such as e.g. bars or paddles which protrude from the surface of the separating device and preferably are arranged perpendicularly or substantially perpendicularly or obliquely with respect to the direction of the relative movement of the surface of the separating device, improve the discharge of solids from the suspension or residual phase and from the device.

The provision of two separating devices for each device, of which the surfaces effective for separation are arranged substantially in parallel with one another and are at a spaced interval of not more than 50 cm, preferably not more than 30 cm from one another, is particularly preferred.

This provides a highly compact device with a large effective separating surface by reason of the presence of two (actively separating) surfaces of the separating devices or separating surfaces. If both surfaces also exhibit the same or approximately the same direction of the relative movement, in particular the same direction of rotation in the space, and the two surfaces of the separating devices are arranged spaced to a sufficiently small extent apart from one another, a particularly effective discharge of solids from the suspension or residual phase and from the device is achieved, wherein the discharged solids have a relatively high dry substance content.

Similar effects are achieved if, in the presence of at least one separating device in the device, the distance from a wall of the device or in particular the receiving unit is sufficiently small, preferably not more than 50 cm, preferably not more than 30 cm.

In accordance with the invention, the control devices can be formed as separate control devices. However, they can also be embodied in one single control device which performs the functions of the first, second, third and/or fourth control device in accordance with the invention.

The advantages of the device in accordance with the invention apply similarly to the system in accordance with the invention.

By connecting several, preferably two to four or more, in particular up to ten, devices in accordance with the invention in series, a multiple-stage separation of solids or residual phases can be achieved. In the case of a system comprising multiple-stage separation, by adjusting the pore sizes of the openings of the surfaces of the individual devices, e.g. pore sizes which become increasingly smaller downstream, it is possible to completely prevent the separating surface from becoming clogged or blocked or at least to delay this for a longer period of time. As a result, the total achievable volumetric flow rate of the medium to be separated is high across the system.

Furthermore, other parameters, such as the degree of coverage or degree of immersion of the surface of the separating device in relation to the suspension or residual phase, the shape of the respective separating device and in particular its respective surface and the other parameters which are stated within the scope of this application relating to the device in accordance with the invention or the system, can be adapted individually in every separating device in the cascade-like arrangement to suit the respective technological characteristics and objectives. This increases the overall flexibility of the system in accordance with the invention and its adaptability to suit the medium to be separated or obtained.

Between two separating stages in the form of a device in accordance with the invention in each case, a portion of an extraction agent, preferably water, can be admixed in each case to the respective residual phase. In the subsequent separating stage, a liquid phase is then obtained in a correspondingly high dilution. The more separating stages the system comprises, the more extensively the residual phase can be washed. However, alternatively or in addition, the extraction agent can also be added to the suspension in the device in accordance with the invention, in particular in the receiving unit.

With regard to a high extraction yield and the avoidance of an undesirably high dilution of the resulting liquid phase, it is particularly efficient if the extraction agent is guided in counterflow with respect to the flow of the suspension and/or the residual phase or residual phases. Therefore, e.g. at the end of the series or cascade of devices or of the system, water can be used as the extraction agent and the liquid phase obtained in the last stage can be used as the extraction agent etc. in the penultimate stage. In this manner, the extraction agent is gradually enriched in counterflow with respect to the suspension or residual phase.

However, a "fresh" extraction agent, such as e.g. water or an alcohol, can alternatively be used in each extraction step (mixing step). In this case, it is advantageous that the washing is more efficient than in the case of the counterflow operation described above, owing to the higher concentration difference. As a result, on the whole fewer separating stages are required overall, which reduces the outlay on equipment and costs.

The advantages of the device in accordance with the invention and the system in accordance with the invention apply similarly to the method in accordance with the invention.

In particular it is part of the invention that all devices, in accordance with the invention, for treating and in particular separating the suspension and/or all devices, in accordance with the invention, for treating a medium (numbers 1 to 16 above) and/or all systems based on these devices (numbers 20 to 42 above) and/or all methods, in accordance with the invention, for treating and in particular separating the suspension and all methods, in accordance with the invention, for treating a medium (numbers 56 or 58 to 67 or 70 to 79) can be combined with one another. Similarly, all of the features and advantages disclosed for the devices and methods in accordance with the invention can also be related to the uses disclosed explicitly and implicitly in this application and also apply to the uses as disclosed.

By supplying an extraction agent, in particular water, to the residual phase of the respective separating step and by providing a unit for this purpose which in each case is arranged in a separating device or in particular downstream with respect to a device and upstream with respect to the subsequent device, controlled washing of the suspension is achieved.

By arranging a barrier element in the flow path downstream with respect to a device in accordance with the invention and upstream with respect to the subsequent device, i.e., in the flow path of the residual phase or the residual phase diluted with the extraction agent between two devices, the suspension is forced to flow over a weir-like obstacle. In this case, solid particle sedimentation can be achieved in the barrier region upstream with respect to the barrier element, thus improving the clarifying effect.

In terms of extensively separating solids and efficiently obtaining soluble substances, it is particularly advantageous to combine a barrier element and a unit for supplying extraction agent, which are both arranged in each case between two devices in accordance with the invention.

The above-described advantages and effects of the corresponding devices or systems in accordance with the invention apply similarly to the uses in accordance with the invention (numbers 100 to 103 above).

All of the inventive devices (V) and the systems based thereon can be operated discontinuously in the batch method. However, it is particularly advantageous if the inventive devices (V) and the systems based thereon are operated continuously. Accordingly, the methods in accordance with the invention described in this application, or the individual method steps, can be operated discontinuously, i.e., batch-wise, or continuously in a particularly advantageous manner. If the method in accordance with the invention consists of several steps, then all of the steps can each be performed continuously and therefore the entire method can be performed continuously. However, alternatively all of the steps can each be performed discontinuously and therefore the entire method can be performed discontinuously. However, the invention is not limited thereto. Accordingly, it is also a part of the invention that within the scope of the method in accordance with the invention continuous and discontinuous method steps can be combined with one another in any manner. The same applies for the design of the device in accordance with the invention, the system in accordance with the invention and the uses in accordance with the invention.

To the inventor's knowledge, in particular no continuous method or a corresponding device for treating or separating a suspension which would satisfy the requirements in practice has hitherto been available.

ALTERNATIVES AND FURTHER DISCLOSURE

The method steps described in this application can either be performed continuously or discontinuously or batch-wise, in each case. This applies in particular to the steps of "treating", "supplying", "separating", "mixing". Preferably, all the method steps belonging to a method in accordance with the invention are performed either continuously or discontinuously or batch-wise. Accordingly, the devices or systems described in this application are suitable for performing a corresponding continuous or discontinuous method. The same applies for the uses described in this application.

DESCRIPTION OF FIGURES/DESCRIPTION OF ADVANTAGEOUS EMBODIMENTS OF THE INVENTION

Figure 1:
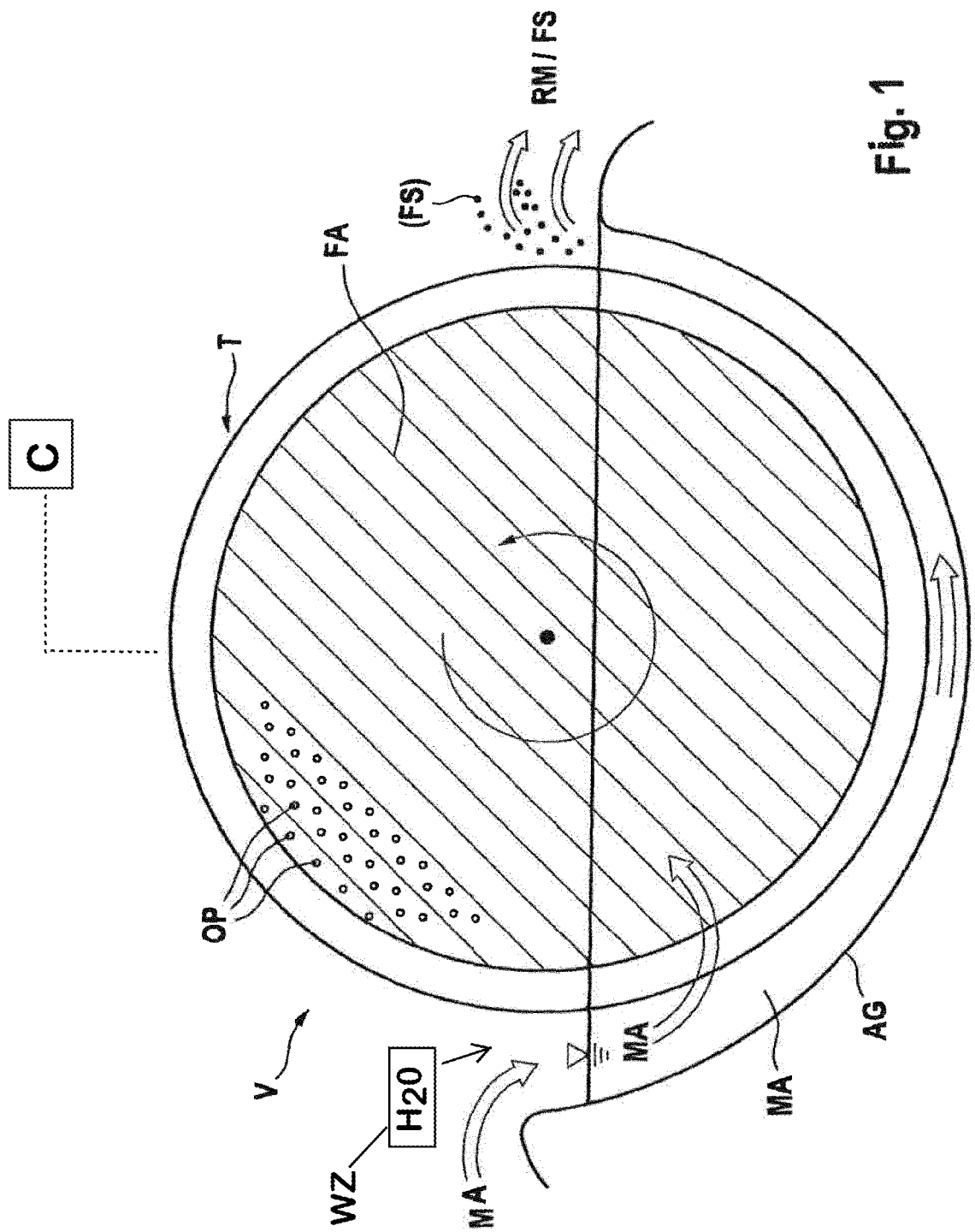
FIG. 1 is a perpendicular sectional view of the device according to the principles of the present invention.

FIG. 1 shows a perpendicular sectional view of an embodiment of the device (V) in accordance with the invention. This device has a receiving unit (AG) for receiving the suspension (MA) and at least one separating device (T) having a surface (FA) (illustrated by hatching). The surface (FA) has a multiplicity of openings (OP) which in the figure are indicated only in a partial region of the surface (FA) for the sake of simplicity. Preferably, all of the partial surfaces of the surface (FA) are provided with openings in order to provide the largest possible filtering surface. In this embodiment, the receiving unit (AG) is formed as a tub-shaped vessel. The separating device (T) is a circular, disk-shaped filter element, on the base surface of which the surface (FA) is arranged. The separating device (T) is mounted so as to be rotatable about a central axis. The central axis is oriented substantially in parallel with the horizontal. In the illustration of FIG. 1, the separating device (T) can rotate both clockwise and anticlockwise. However, the direction of rotation is preferably "anticlockwise".

In the figure, the suspension (MA) flows from the left into the receiving unit (AG) and partially covers the separating device (T) and in particular the surface (FA). The suspension to be separated comes into contact with the surface (FA) formed as the filter layer. In this case, liquid particles pass through the filter layer and are discharged on the filtrate side as liquid phase (WO) in or beyond the separating device (T). Since, during the separation, the surface (FA) performs a relative movement by rotating anticlockwise (cf. rotational arrow in FIG. 1), the surface (FA) covered by the suspension is in movement relative to the suspension (MA). Moreover, by reason of the rotation, parts of the surface (FA) constantly exit from the suspension (right half of the surface (FA)), whereas other parts of the surface (FA) (left half of the surface (FA)) are immersed underneath the level of the suspension and thus are then covered by the suspension (MA). On the right-hand side of the device, the residual phase (RM) which results during the separation of the liquid phase (WO) exits from the device (V) through the spillover element and/or assisted by the rotating separating device (T). In the region where the surface (FA) appears, solid particles (FS), in particular relatively "dry" solid particles, can likewise be discharged from the device (V) during the rotation owing to the relative movement.

Figure 2:
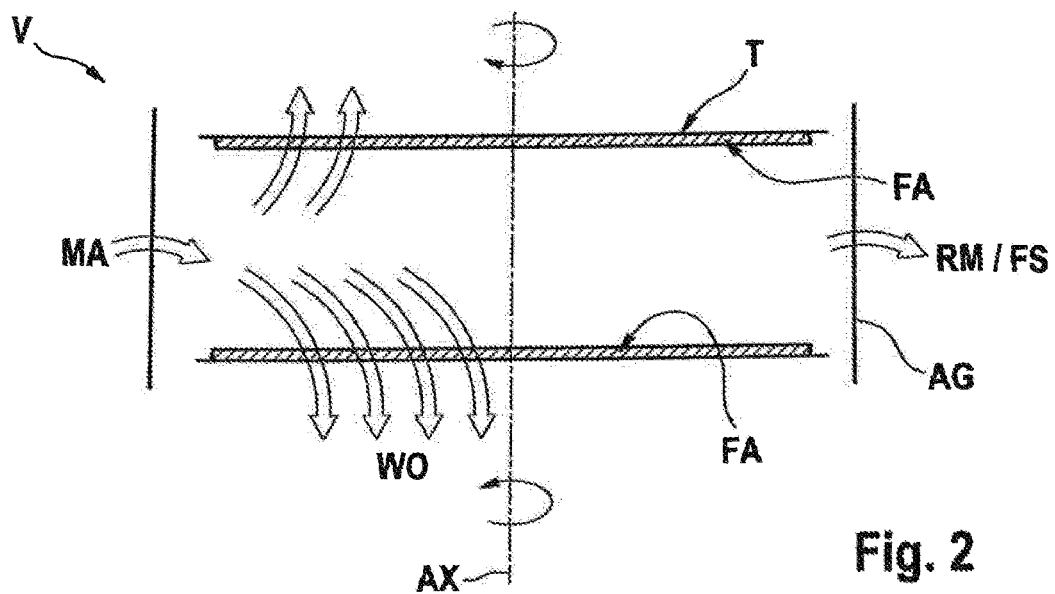
FIG. 2 is a sectional view of the device.

The device (V) in accordance with the invention is illustrated in a horizontal sectional view in FIG. 2. This figure illustrates once again the entry of the suspension (MA) into the receiving unit (AG) and the passage through the surface (FA) with the liquid phase (WO) being obtained. In this embodiment, the device (V) has two separating devices (T) which are arranged substantially in parallel and can rotate about a common axis of rotation (AX) (preferably in the same direction).

Figure 3:
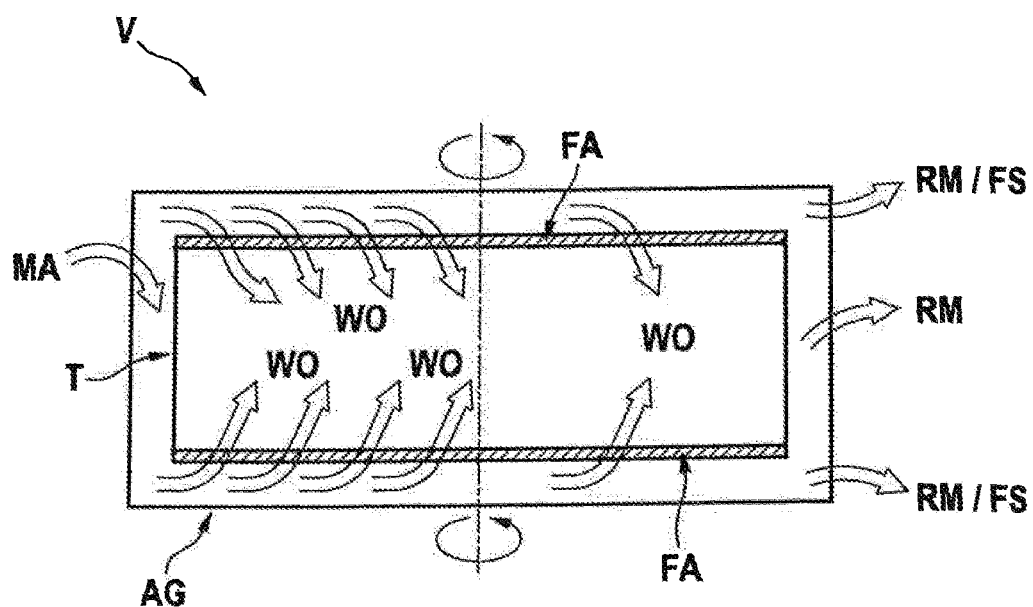
FIG. 3 shows the device with a separating device configured as a rotating cylinder.

In a particular embodiment illustrated in FIG. 3, the device (V) has a separating device (T) in the form of a rotating cylinder, of which both base surfaces are each designed as a surface (FA). In this case, the liquid phase (WO) penetrates from outside through the filter layers into the interior of the separating device (D) where it is collected and distilled.

Figure 4:
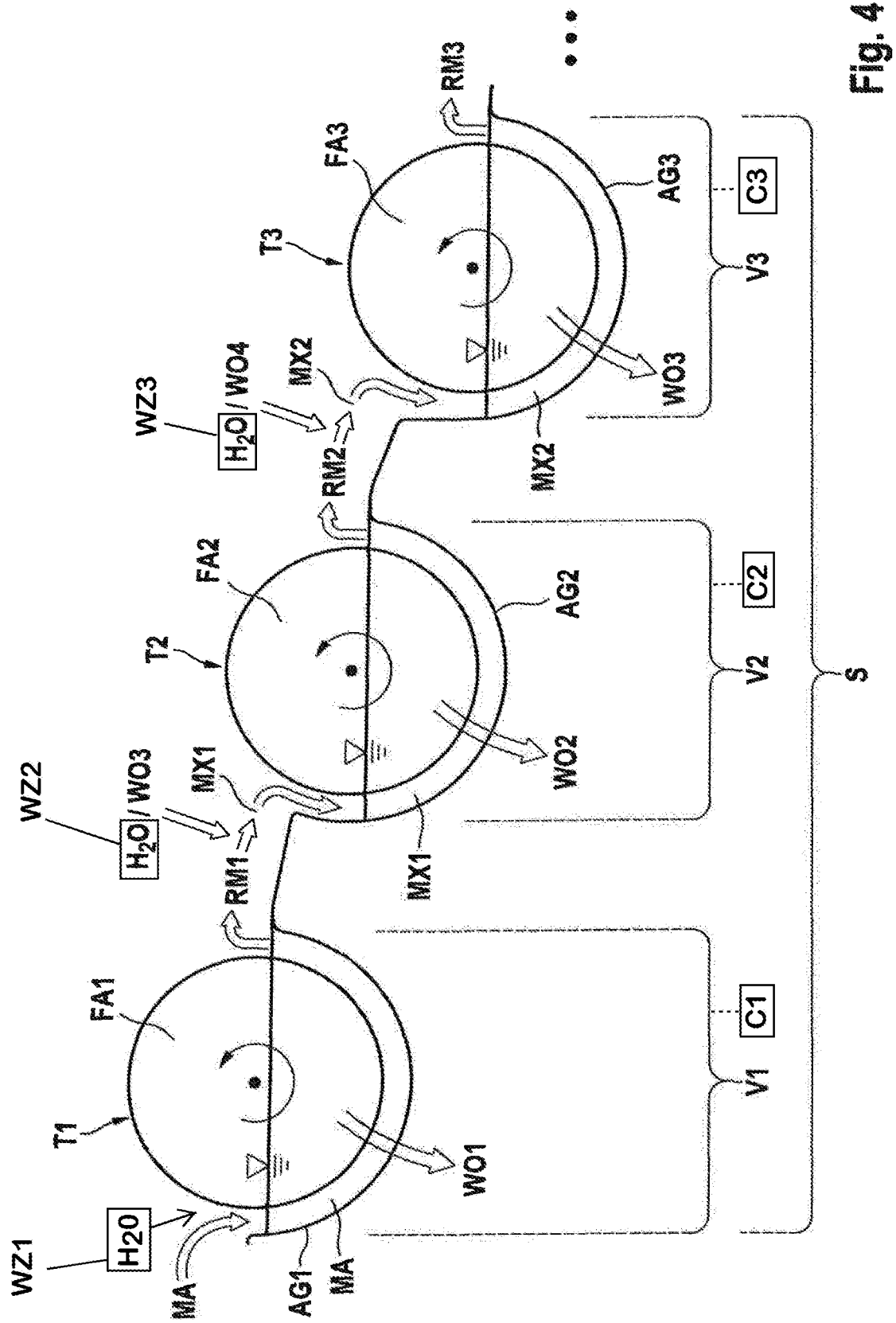
FIG. 4 shows three devices connected in a cascading arrangement.

FIG. 4 illustrates a system in accordance with the invention which is formed as a series connection or cascade of three devices (V) in accordance with the invention. After separating the suspension (MA) into the first liquid phase (WO1) and the first residual phase (RM1) in the first device (V1), as described, the first liquid phase (WO1) is distilled. At the same time, the first residual phase (RM1) produced spills over from the first device or is actively discharged by means of the separating device (T) depending upon the fill level of the suspension (MA) in the separating device (T). Added to the discharged first residual phase (RM1) is an extraction agent, such as preferably water or a liquid phase (e.g. WO3) from a subsequent method step, so as to extract the extractable substances still present in the first residual phase (RM1). The resulting first mixture (MX1) is separated in the second device (V2) in a similar manner to the suspension (MA) in the first device (V1). The resulting second liquid phase (WO2) is distilled and the remaining second residual phase (RM2) is discharged from the second device (V2). In the third device (V3), the aforementioned steps are performed in a similar manner. Each further stage brings about a further depletion of the residual phase produced.

In the case of both the device (V) as shown in FIG. 1 and the system in accordance with the invention comprising three devices (V1, V2, V3) as shown in FIG. 4, all of the media involved flow through the device or system in a manner driven substantially by gravity.

The respective residual phase (RM1, RM2, RM3, . . . ) can be discharged from the respective device (V1, V2, V3, . . . ) both by providing only one device and also by providing a cascade of at least two devices (V1, V2, V3, . . . ) in dependence upon the fill level of the suspension or residual phase in the device (V1, V2, V3, . . . ) through the spillover element. Alternatively, the respective residual phase (RM1, RM2, RM3, . . . ) can be discharged from the respective separating device when a fill level is below the spillover level by actively transporting the respective residual phase preferably by means of the moving separating device (T) or by means of a conveying device independent thereof

The invention claimed is:

1. Device for continuously or discontinuously separating a liquid or liquid phase, or a solid phase or residual phase from a suspension containing plant constituents, for production of food, pharmaceutical and luxury products, comprising:
    a tub-shaped vessel for receiving the suspension;
    two separators, each of the two separators having a surface;
    wherein each of the surfaces comprises a flat or planar surface and has a plurality of openings;
    wherein each of the surfaces or a part thereof is operable to be brought into contact with the suspension, if the suspension is present in the vessel for separation into the liquid phase and the solid phase;
    wherein, during operation of the device, each of the surfaces is arranged such that each of the surfaces is movable or rotatable relative to the suspension, the solid phase and/or the vessel;
    wherein each of the two separators is disk-shaped or substantially disk-shaped and configured as a separator having a rotatably mounted shaft or as a rotatably mounted separator or rotatably mounted filter;
    wherein the two separators are arranged in the device such that a spaced interval, which is measured as a normal spaced interval between the two surfaces of the two separators, is 4-30 cm;
    wherein the two separators are selectively arranged in the device with an axis of rotation of both of the separators being substantially perpendicular to a flow direction of the suspension flowing into the device and substantially perpendicular to a residual phase flowing out of the device.

2. Device according to claim 1, wherein the openings have a size or pore size or aperture of 10 to 500 μm.

3. Device according to claim 1, wherein the device forms at least one flow path; and/or
    a liquid flows through the at least one flow path driven by gravity.

4. Device according to claim 1,
    wherein the two separators are each arranged in the device such that a central axis or an axis of rotation of each of the two separators or their surfaces is arranged substantially parallel with the liquid level of a liquid introduced into the vessel of the device, or the central axis or an axis of rotation of each of the two separators or their surfaces forms, together with the liquid level of a liquid introduced into the vessel of the device or with the horizontal, an angle with a value of 0 to 90°; and/or
    wherein the two separators are arranged with respect to one another in the device such that the central axes or an axis of rotation of each of the two separators or their surfaces form an angle with a value of 0 to 90°; and/or
    wherein the two separators have an identical central axis or axis of rotation or their central axes or axes of rotation are arranged collinearly in the device; and/or
    wherein the two separators have a common rotary shaft.

5. System for continuously or discontinuously treating a liquid or liquid phase, or a solid phase or a residual phase from a suspension containing plant constituents, for production of food, pharmaceutical and luxury products, comprising:
    a first device;
    wherein the first device has a first tub-shaped vessel for receiving the suspension;

wherein the first device has at least two first separators, each of the at least two first separators having a first surface;

wherein the first surface comprises a flat or planar surface and has a multiplicity of openings;

wherein the first surface is operable to be brought into contact with the suspension, if the suspension is present in the first vessel for separation into a first liquid phase and the first residual phase;

wherein, during operation of the first device, the first surface is arranged such that the first surface is movable or rotatable relative to the suspension, the first residual phase and/or the first vessel;

wherein the at least two first separators are operable to be controlled by a first control device so that a relative movement or rotational movement of the first surface is effected during an entire period of separation of the suspension;

wherein the at least two first separators are disk-shaped or substantially disk-shaped and configured as a separator having a rotatably mounted shaft or as a rotatably mounted separator or rotatably mounted filter;

wherein the at least two first separators are arranged in the first device such that a largest spaced interval, which is measured as a normal spaced interval between the two surfaces of the at least two first separators, is 30 cm; and a smallest spaced interval, which is measured as a normal spaced interval between the two surfaces of the at least two first separators, is 4 cm;

wherein the at least two first separators are selectively arranged in the device with an axes of rotation of the least two separators being substantially perpendicular to a flow direction of the suspension flowing into the device and substantially perpendicular to a residual phase flowing out of the device.

6. System according to claim 5, which further comprises:
a second device;
wherein the second device has a second vessel, for receiving the first residual phase or a mixture containing the first residual phase;
wherein the second device has at least a second separator having a second surface;
wherein the second surface comprises a flat or planar surface and has a multiplicity of openings;
wherein the second surface is operable to be brought into contact with the first residual phase if the first residual phase is present in the second vessel for separation into the second liquid phase and a second residual phase;
wherein, during the operation of the second device, the second surface is arranged such that the second surface is movable or rotatable relative to the first residual phase, the second residual phase and/or the second vessel; and
wherein the second separator is disk-shaped or substantially disk-shaped and is operable to be controlled by a second control device so that relative movement of the second surface is effected in an uninterrupted or intermittent manner, during the entire period of separation of the first residual phase.

7. System according to claim 5, wherein two or three devices, selected from the group consisting of the first device, a second device, and a third device are connected in series or in parallel.

8. System according to claim 7, wherein
the first device has a first liquid outlet opening; and/or
the second device has a second liquid outlet opening; and/or
the third device comprising a third vessel and a third liquid outlet opening.

9. System according to claim 5, wherein
a first liquid outlet opening is arranged between the first device and a second device; and/or
a second liquid outlet opening is arranged between the second device and a third device; and/or
a third liquid outlet opening is arranged after the third device.

10. System according to claim 5, wherein a first outlet opening, a second outlet opening and/or a third outlet opening are each formed as a flat jet nozzle, spray head or spray cone.

11. System according to claim 5, wherein the system has at least one barrier;
wherein a first barrier is arranged downstream with respect to the first device and upstream with respect to a second device; and/or
wherein a second barrier is arranged downstream with respect to the second device and upstream with respect to a third device; and/or
wherein a third barrier is arranged downstream with respect to the third device.

12. The system according to claim 6, wherein two or three devices, selected from the group consisting of the first device, the second device, and a third device are connected in series.

13. The device according to claim 1, wherein the largest spaced interval is 25 cm and the smallest spaced interval is 5 cm.

14. The system according to claim 5, wherein the largest spaced interval is 25 cm and the smallest spaced interval is 5 cm.

* * * * *